United States Patent [19]

Kuhl et al.

[11] Patent Number: 4,672,323

[45] Date of Patent: Jun. 9, 1987

[54] DEVICE FOR MEASURING THE INTERNAL PRESSURE OF AN OPERATIONALLY BUILT BUILT-IN VACUUM SWITCH

[75] Inventors: Wilfried Kuhl, Grosschwarzenlohe; Leonhard Klug, Erlangen; Bernd Rost, Erlangen; Wolfgang Schilling, Erlangen, all of Fed. Rep. of Germany

[73] Assignee: Siemens Aktiengesellschaft, Munich, Fed. Rep. of Germany

[21] Appl. No.: 676,817

[22] Filed: Nov. 30, 1984

[30] Foreign Application Priority Data

Dec. 27, 1983 [DE] Fed. Rep. of Germany ....... 3347176

[51] Int. Cl.[4] ............ G01L 21/30

[52] U.S. Cl. ............ 324/460; 324/463; 200/144 B

[58] Field of Search ............ 324/460, 463, 459; 200/147 A, 144 B; 340/644, 626

[56] References Cited

U.S. PATENT DOCUMENTS

| | | | |
|---|---|---|---|
| 2,864,998 | 12/1958 | Lee | 324/33 |
| 3,263,162 | 7/1966 | Lucek et al. | 324/463 |
| 3,369,095 | 2/1968 | Maggi | 200/147 A |
| 3,575,656 | 4/1971 | Watrous | 324/463 |

FOREIGN PATENT DOCUMENTS

| | | | |
|---|---|---|---|
| 0056722 | 7/1982 | European Pat. Off. | 324/460 |

*Primary Examiner*—Gerard R. Strecker
*Assistant Examiner*—Robert W. Mueller
*Attorney, Agent, or Firm*—Kenyon & Kenyon

[57] ABSTRACT

A device for measuring the internal pressure of an operationally built-in vacuum switch which comprises a vacuum switching tube having a switching chamber and switch contacts as well as an associated drive for the contacts. For the measurement of the pressure, a cold-cathode discharge (so-called Penning effect) having crossed electric and magnetic fields is used, wherein the electric field is applied, for instance, between at least one of the switch contacts and a metallic wall of the switching chamber or a condensation shield disposed in the chamber and permanent magnets are used for generating the magnetic field. The permanent magnets are realized in the form of rods and have pole pieces formed such that the pole pieces encircle the switching chamber. A magnetic field is formed which is applied directly in the longitudinal direction to a circumferential section of the cylindrical switching chamber. In order to measure the pressure inside the vacuum switching tube built into a switching installation, the voltage drop across a resistor disposed in series with a d-c source and the switch is measured. The voltage drop corresponds to the ionization current, which is dependent on the gas pressure in the chamber. The pole pieces of the permanent magnets extend around the switching chamber and fix the magnets around the switching chamber during the measurement. The sensitivity range of the measurement can be influenced by the number of permanent magnets used.

9 Claims, 4 Drawing Figures

DEVICE FOR MEASURING THE INTERNAL PRESSURE OF AN OPERATIONALLY BUILT BUILT-IN VACUUM SWITCH

BACKGROUND OF THE INVENTION

The present invention relates to a device for measuring the internal pressure of an operationally built-in vacuum switch wherein the vacuum switch comprises a vacuum switching tube defining a switching chamber with switch contacts disposed therein and a drive unit associated with the contacts and wherein a cold-cathode discharge affect (Penning effect) with crossed electric and magnetic fields is utilized to measure the pressure, the electric field being applied between at least one of the switch contacts and the metallic wall of the switching chamber or the condensation shield disposed therebetween and wherein permanent magnets are used for generating the magnetic field.

In the manufacture of vacuum switching tubes it is necessary to measure the internal pressure of the evacuated vacuum switch housings. To this end, for instance, the entire switching tube is placed in an electromagnet coil which is arranged concentrically with the axis of the switch and which generates a magnetic field. At the same time an electric field is applied to electrically conducting parts of the switching tube in such a manner that the electric and the magnetic field are at right angles to each other, at least in subregions of the inner volume of the switching tube. By utilizing the so-called Penning effect, a cold-cathode discharge, and thereby an ion current can be generated, the value of which is proportional to the internal pressure of the switching tube in the pressure region of $10^{-8}$ to $10^{-3}$ mbar.

In the known measuring arrangements, it is generally assumed that the switching tube is available as an individual component which is accessible from all sides. This is assumed, for instance, in U.S. Pat. No. 3,263,162, wherein the electric field is applied between a switch contact and the necessary vapor shield arranged in the switching chamber with the switch contacts open, and the magnetic field is generated by a coil. As an alternative thereto, it is also known from U.S. Pat. No. 2,864,998 to apply, for instance, on the one hand, the electric field between the closed contacts and the metallic vapor shield and, on the other hand, to use permanent magnets for generating a crossing magnetic field. Specifically, in the device described in U.S. Pat. No. 2,864,998, the field lines of the electric and magnetic fields are perpendicular only in subregions, so that overall comparatively high field strengths become necessary.

It would be desirable to be able to check the internal pressure of vacuum switching tubes during the entire life of the switching tubes, i.e., also during the switching operation.

It is difficult, however, to make reliable internal-pressure measurements on switching tubes which are installed in switching installations containing the associated drive because accessibility often is limited considerably and, in particular, the vacuum switching tube can no longer be placed in a coaxial cylinder coil. While a vacuum switching tube is described in European patent publication No. 0056722 which contains a so-called "on-line" vacuum monitoring system, the Penning effect is likewise utilized therein and the necessary magnetic field generated by components permanently associated with the vacuum switching tube. These components either may be magnetic-field-generating coils or permanent magnets which are arranged inside or outside the switching chamber. In particular, a permanent magnet can be placed around the switching chamber in ring-like fashion.

In particular, the last-mentioned arrangement with integrated components for "on-line" monitoring is comparatively expensive. It can have disadvantages when used in customary vacuum switches because the switching behavior is influenced by the magnetic field of the permanent magnets.

For reasons of operation monitoring, however, the internal pressure of vacuum switching tubes in operation is to be measured in the pressure range of about $10^{-8}$ to $10^{-3}$ mbar. This measurement should be possible selectably in the testing laboratory or also by the user without having to disassemble the switching tube from the drive so that expensive mechanical adjustment work to the drive, for instance, stroke changes, is unnecessary.

SUMMARY OF THE INVENTION

It is, therefore, an object of the present invention to provide a device of the type mentioned above which operates with permanent magnets and which can readily be used for the different requirements of practical applications.

It is furthermore an object to provide such a device which can be removeably attached to the switching tube.

The above and other objects of the present invention are achieved by providing that the permanent magnets are rodshaped and have pole pieces formed such that they can be applied in the longitudinal direction to a circumferential section of the cylindrical switching chamber of the vacuum switch built into a switch drive for the pressure measurement, and wherein the pole pieces of the permanent magnets extend around formed metallic parts of the switching chamber and also fix the magnet arrangement around the switching chamber for the measurement. In the arrangement according to the invention, at least one permanent magnet is necessary. Preferably, however, two or four permanent magnets are provided, the pole pieces forming respectively semicircular formations. The base plates of the switching chamber thereby can be completely surrounded and the magnets can be fixed for the measurement. It is always advantageous also that accessibility is insured for closely adjacent vacuum tubes of a complete switching installation with associated switch drives due to the low overall height of the separate magnet arrangements.

Due to the design of the permanent magnet arrangement, measurements can be made with comparatively low field strengths. The desired pressure range of $10^{-8}$ to $10^{-3}$ mbar can be covered, for which purpose an axial permanent magnet field in the center of the vacuum tube chamber should be approximately $10^{-2}$ Tesla. By optimizing the pole pieces it also can be achieved that the magnetic field reduction is not more than 75 percent in the case of a single permanent magnet attached on one side at the edge opposite the magnet. If the measurement is preferably done with the switch contacts closed and the contact arrangement is connected to anode potential and the metallic housing of the switching chamber to cathode potential, electric fields between 1 and 4 kV and preferably 2 kV can be used.

For the layout of the electrical measuring units, conventional means known from the state of the art can be used. The ion current flows through a measuring resistor, whereby the voltage drop across the resistor can be recorded via a suitable extreme-value voltmeter by calibration or test measurements, and suitable characteristics for the respectively used magnet arrangement can be determined. Conventional rod magnets can be used as the permanent magnets which comprise known materials. If high performance magnets of AlNiCo are used it is possible to distribute individual rod magnets over the entire switch circumference due to their small spatial extent, whereby two groups of magnets are associated with each other via common pole pieces having semicircular recesses.

BRIEF DESCRIPTION OF THE DRAWINGS

The invention will be described in greater detail in the following detailed description with reference to the drawings, in which.

DETAILED DESCRIPTION

Figure 1:
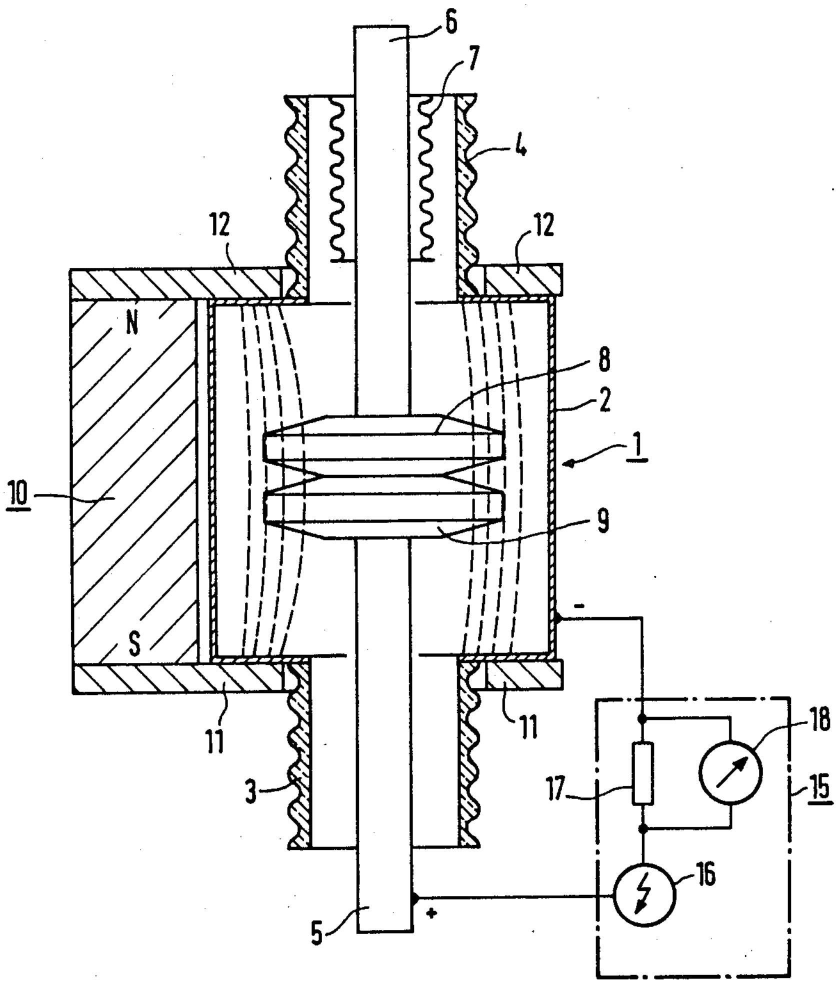
FIG. 1 illustrates the principle of the measuring device and method with the aid of a cross-sectional view of a vacuum switching tube having a permanent magnet applied and wherein electrical measuring units are indicated in a circuit diagram.

In the various drawings, like parts, and in particular, the parts of the vacuum switching tube, are provided with like reference symbols. With reference now to the drawings, and in particular FIG. 1, reference numeral 1 generally designates a vacuum switch comprising essentially a vacuum switching tube having a switching chamber 2 and a first switch contact 8 arranged fixedly therein, as well as a second switch contact 9 arranged oppositely and movably relative thereto. The switching chamber comprises a metallic hollow cylinder with respectively shaped annular metal parts, in which ceramic insulators 3 and 4 are attached in a vacuumtight manner on both sides. In FIG. 1 a first contact pin 5 is rigidly inserted into the lower insulator 3, while a second contact pin 6 is arranged in the other insulator 4 movably relative thereto by means of flexible metal bellows 7. The contact pins 5 and 6 carry on their ends facing each other respective contacts 8 and 9, the design and material of which need not be discussed herein in detail.

In the fabrication of the described vacuum switch, the switching chamber, after assembly and vacuum-tight connection of the parts, is evacuated and separated from the vacuum pump by squeezing off the pumping tube. Checking for vacuum-tightness as well as measurement of the final pressure obtained after contact is made normally follows the fabrication process. In the following, a measuring setup for a measurement utilizing the Penning effect is described, with which a measurement also can be performed if a vacuum switching tube is subsequently built into a switching installation.

In FIG. 1, a rod magnet 10 is tangentially applied to a circumferential section of the cylindrical switching chamber 2. As shown in the cross-sectional view of FIG. 1, pole pieces 11 and 12 of soft iron are attached on both sides to the poles of the rod magnet, the length of which is matched to the cylindrical height of the switching chamber tube. The pole pieces 11 and 12 extend from the north and south pole of the rod magnet 10 over the base surfaces of the vacuum switching tube 1 and surround the switching chamber 2 at the transitions to the insulator paths 3 and 4 in ring-like fashion.

In FIG. 1, the magnetic field lines generated by the magnet 10 having pole pieces 11 and 12 are indicated schematically. By the specific design of the pole pieces it is insured also that the reduction of the magnetic field is not more than 75 percent of the initial field, even if the magnet is attached unilaterally on the side of the switching chamber 2 opposite the magnet shown. Through the choice of suitable permanent magnets it can be achieved that a magnetic field of $10^{-2}$ Tesla is present at the central axis of the switching chamber 2.

In the described embodiment, the magnetic field extends substantially axially or in directions parallel thereto. Electrically, the switching chamber 2 is connected so that the measurement is made with the contacts 8 and 9 closed. Anode potential is applied to the contacts and cathode potential to the oppositely disposed metallic jacket of the switching chamber 2. The electrical voltage supply and measuring arrangement is designated by 15 and comprises a d-c voltage source 16, the positive output of which is connected to the contact pin 6 and the negative output to the wall or condensation shield of the switching chamber 2. This generates a radial electric field which is largely perpendicular to the generated magnetic field in the entire region. By connecting the wall of the housing tube to the negative potential, an optimally large cathode is formed which, as a cold cathode, serves to emit electrons. The electric field can be between approximately 1 and 4 kV and may, for instance, be 2 kV.

The emitted electrons do not arrive immediately at the anode due to the crossed electric and magnetic fields, but rather move in approximately spiral-shaped trajectories. The travel distance is increased sufficiently to achieve enough ionization of still present gas molecules in the low pressure range. The ion current then can be determined as a measure for the pressure. This measuring method is sufficiently well known in vacuum engineering.

While, however, electric voltages between 1,000 and 20,000 V and magnetic fields between 0.2 and 0.35 Tesla generally are required for starting a discharge, utilizing the described Penning effect, it was possible to demonstrate by means of extensive investigations that the lower electric voltages and lower magnetic field strengths are already sufficient in the described arrangement.

The electric circuit is connected in series with a resistor 17 having the resistance value $R_M$ at which the voltage drop can be measured by means of a parallel-connected peak voltmeter 18. With $R_M$ known, the current is determined from the voltage drop and a calibration of the ion current as a function of the pressure in the vacuum switching tube 1 may be obtained. From the respective calibration curve, which depends on the type of switching tube, conclusions can be drawn, after the ion current is measured, as to the internal pressure of the operationally built-in vacuum switch.

Figure 2:
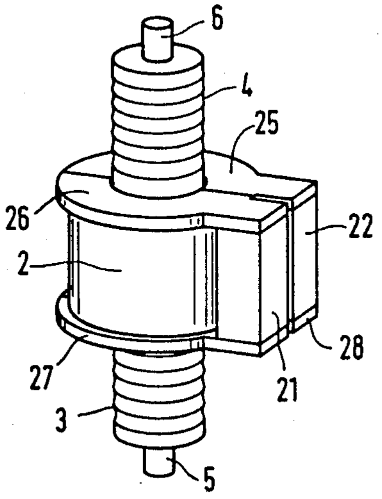
FIGS. 2 to 4 show in perspective views, in the measuring position of the vacuum switching tube, three different embodiments of the arrangement of permanent magnets and associated pole pieces.
Figure 3:
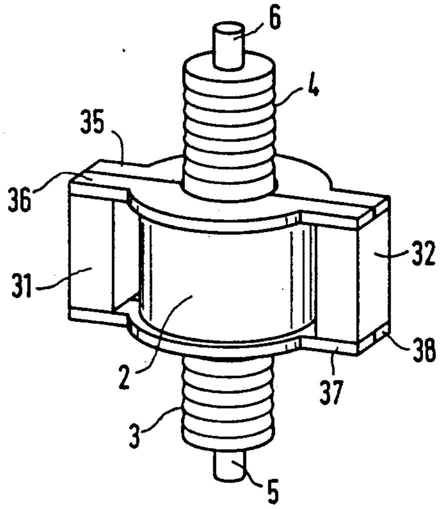
Figure 4:
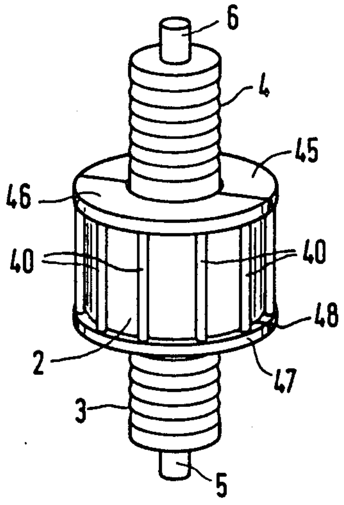

In FIGS. 2 to 4, reference numeral 2 identifies the cylindrical switching chamber having the insulators 3 and 4 as indicated, as well as the switch pins 5 and 6. The design of the pole pieces used for the rod magnets is shown more clearly in these perspective views.

In FIG. 2, two rod magnets 21 and 22 are arranged at a certain circumferential section of the switching chamber 2 adjacent to each other. Each of the magnets 21 and 22 has at its opposite ends identically shaped pole pieces 25 to 28 which each form approximately one-half a ringwasher starting from the cross-sectional surface of the magnet. The two ringwashers of the two magents 21 and 22 supplement each other, being designed with mirror symmetry to each other, and form an overall ring which surrounds the insulator extensions completely.

In FIG. 3, rod magnets 31 to 32 are provided, which however, are located at two opposite circumferential sections of the switching chamber 2. Four pole pieces 35 to 38 associated with the magnetic poles again form a half ring each, one magnet with two pole pieces forming a unit. By joining the two subunits with mirror symmetry, the vacuum switching tube is again completely surrounded at the insulator extension.

In the arrangements of the permanent magnets having pole pieces as shown in FIGS. 2 and 3, it is ensured by the relatively flat design and the mirror symmetry of the pole pieces to each other that the latter can be applied also around switching tubes which are built closely adjacent side by side into switching installations. With the customary magnetic materials, e.g., iron oxides, and the given boundary conditions, the value of the cross-sectional area of the rod magnets cannot fall below a given value. To this extent, the individual magnets then must be arranged opposite each other in groups of more than two, for instance, four magnets are chosen.

Magnetic materials of high effectiveness, however, are also known which make it possible to make individual rod magnets substantially slimmer. In this case it is possible to surround the entire switch housing 2 with a plurlaity of individual magnets, as shown in detail in FIG. 4. Identical rod magnets 40 of AlNiCo 700 are evenly spaced around the switch housing. The upper and lower pole pieces 45 to 48 are designed in accordance with FIGS. 2 and 3 but need not contain extensions in this case. The two subarrangements thus provide semicylindrical structures which can be placed around a switching tube for a vacuum measurement according to the Penning effect when required.

For the practical application of the desired device, a number of permanent magnets can be chosen which are matched to the problem. For test measurements in a relatively poor vacuum, a single magnet may be sufficient in practice. If a measurement is to be performed, however, over a larger measuring range with a relatively good vacuum and if a linear characteristic is desired, the number of rod-shaped permanent magnets must be increased accordingly, and particularly, in the lowest pressure range, the firing limit of the gas discharge is heavily dependent on the pattern of the magnetic field. In all cases, it is achieved by the invention that a measurement can be performed with optimally low electric and magnetic fields even for vacuum switches operationally built into switching installations.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus for measuring the internal pressure of an operationally built-in vacuum switch, the vacuum switch comprising a vacuum switching tube defining a vacuum chamber having an outer metal wall and switch contacts disposed in the chamber, drive means for opening and closing the contacts, said apparatus comprising means for providing a Penning effect cold-cathode discharge with crossed electric and magnetic fields wherein the electric field is applied between the switch contacts in a closed condition and at least one of the metallic wall of the switching chamber and a condensation shield, if present, disposed inside said switching chamber, and further comprising permanent magnet means for generating said magnetic field, said magnetic field extending substantially axially in said switching tube, said permanent magnet means comprising rod magnet means having a length corresponding substantially to a height of the vacuum switching tube wall, and having pole piece means, said permanent magnet means for applying said magnetic field being disposable in a longitudinal direction of said switching chamber to an outer circumferential section of the wall of said switching chamber, said pole piece means extending around said switching chamber and fixedly holding said magnet means in form-locking manner around said switching chamber wall during said pressure measurement, the electric field being applied such that the anode potential of a supply voltage is supplied to the switch contacts and a cathode potential is supplied to the wall of the switching chamber or the condensdation shield.

2. The apparatus recited in claim 1, wherein said permanent magnet means comprises a single permanent magnet.

3. The apparatus recited in claim 1, wherein said magnet means comprises two permanent magnets, each of which have pole pieces having a semicircular form, said magnets being disposed adjacent one another, said pole pieces disposed so as to encircle said switching chamber.

4. The apparatus recited in claim 1, wherein said magnet means comprises two permanent magnets disposed adjacent said switching chamber opposite one another, said magnets having semicircular pole pieces, said pole pieces disposed so as to encircle said switching chamber.

5. The apparatus recited in claim 1, wherein said permanent magnet means comprises iron oxide.

6. The apparatus recited in claim 1, wherein said magnet means comprises a plurality of rod-shaped permanent magnets spaced around said switching chamber and semicircular pole pieces holding said magnets in position disposed so as to encircle said switching chamber.

7. The apparatus recited in claim 6, wherein said permanent magnets comprise an AlNiCo alloy.

8. The apparatus recited in claim 1, wherein said pole pieces comprise soft iron.

9. The apparatus recited in claim 1 wherein the anode to cathode potential difference is between 1 and 4 kV and is preferably 2 kV.

* * * * *